United States Patent
Iwama et al.

(10) Patent No.: US 11,763,960 B2
(45) Date of Patent: Sep. 19, 2023

(54) WIRE HARNESS

(71) Applicants: SUMITOMO WIRING SYSTEMS, LTD., Yokkaichi (JP); HONDA MOTOR CO., LTD., Tokyo (JP)

(72) Inventors: Takuji Iwama, Yokkaichi (JP); Kotaro Tagami, Tokyo (JP); Hiroaki Ota, Tokyo (JP); Masataka Ohashi, Tokyo (JP)

(73) Assignees: SUMITOMO WIRING SYSTEMS, LTD., Mie (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/681,050

(22) Filed: Feb. 25, 2022

(65) Prior Publication Data

US 2022/0285045 A1 Sep. 8, 2022

(30) Foreign Application Priority Data

Mar. 5, 2021 (JP) .................. 2021-035839

(51) Int. Cl.
*H01B 7/00* (2006.01)
*H01B 7/18* (2006.01)
*B60R 16/02* (2006.01)

(52) U.S. Cl.
CPC ........... *H01B 7/0045* (2013.01); *H01B 7/185* (2013.01); *B60R 16/0215* (2013.01)

(58) Field of Classification Search
CPC .. H01B 7/0045; H01B 7/185; B60R 16/0207; B60R 16/0215; H02G 3/0418
See application file for complete search history.

(56) References Cited

U.S. PATENT DOCUMENTS

| | | | |
|---|---|---|---|
| 4,421,945 A * | 12/1983 | Moisson ................. | B29C 61/10 |
| | | | 174/DIG. 8 |
| 2009/0305568 A1* | 12/2009 | Ambo ..................... | H01R 31/08 |
| | | | 439/889 |
| 2015/0041175 A1 | 2/2015 | Nakai et al. | |
| 2017/0076841 A1 | 3/2017 | Nakai et al. | |
| 2019/0023199 A1* | 1/2019 | Nakai ...................... | H01B 7/04 |
| 2020/0041042 A1* | 2/2020 | Vaccaro ................. | F16L 3/137 |
| 2020/0062197 A1* | 2/2020 | Nakaizumi ............... | F16L 5/00 |

* cited by examiner

*Primary Examiner* — Paresh Paghadal
(74) *Attorney, Agent, or Firm* — Oliff PLC

(57) ABSTRACT

A wire harness includes a first electric wire member including a first flexible wire and a hard wire electrically connected to the first flexible wire, a second electric wire member including a second flexible wire, and a tubular member through which the first and second electric wire members extend. The wire harness also includes a tubular holder that is attached to a longitudinal end portion of the tubular member and holds the first and second electric wire members therein. The holder has a first housing recess that is located in an inner surface of the holder and houses the second electric wire member.

14 Claims, 8 Drawing Sheets

WIRE HARNESS

BACKGROUND

1. Field

The present disclosure relates to a wire harness.

2. Description of Related Art

A conventional wire harness used for a vehicle, such as a hybrid vehicle or an electric vehicle, includes electric wires and a metal shield pipe through which the electric wires extend. The ends of the electric wires are drawn out from the ends of the shield pipe and then routed through desired paths to be connected to electric devices. Japanese Patent Application Publication No. 2015-35915 describes a wire harness of this type that includes a plastic holder attached to an axial end of the shield pipe. The plastic holder attached to the inside of the shield pipe reduces the likelihood that the edge of the shield pipe will come into contact with the electric wires extending through the shield pipe and thus damages the insulation coatings of the electric wires.

With the conventional wire harness, however, the electric wires may turn or move within the holder, so that the arrangement positions of the electric wires within the holder may deviate from their intended positions. This may compromise the routing of the wire harness.

SUMMARY

It is an objective of the present disclosure to provide a wire harness that limits a decrease in ease of routing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wire harness is provided that includes a first electric wire member including a first flexible wire and a hard wire electrically connected to the first flexible wire, a second electric wire member including a second flexible wire, a tubular member through which the first and second electric wire members extend, and a tubular holder that is attached to a longitudinal end portion of the tubular member and holds the first and second electric wire members therein. The holder has a first housing recess that is located in an inner surface of the holder and houses the second electric wire member.

Advantageous Effects of Invention

A wire harness according to the present disclosure advantageously limits a decrease in ease of routing.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
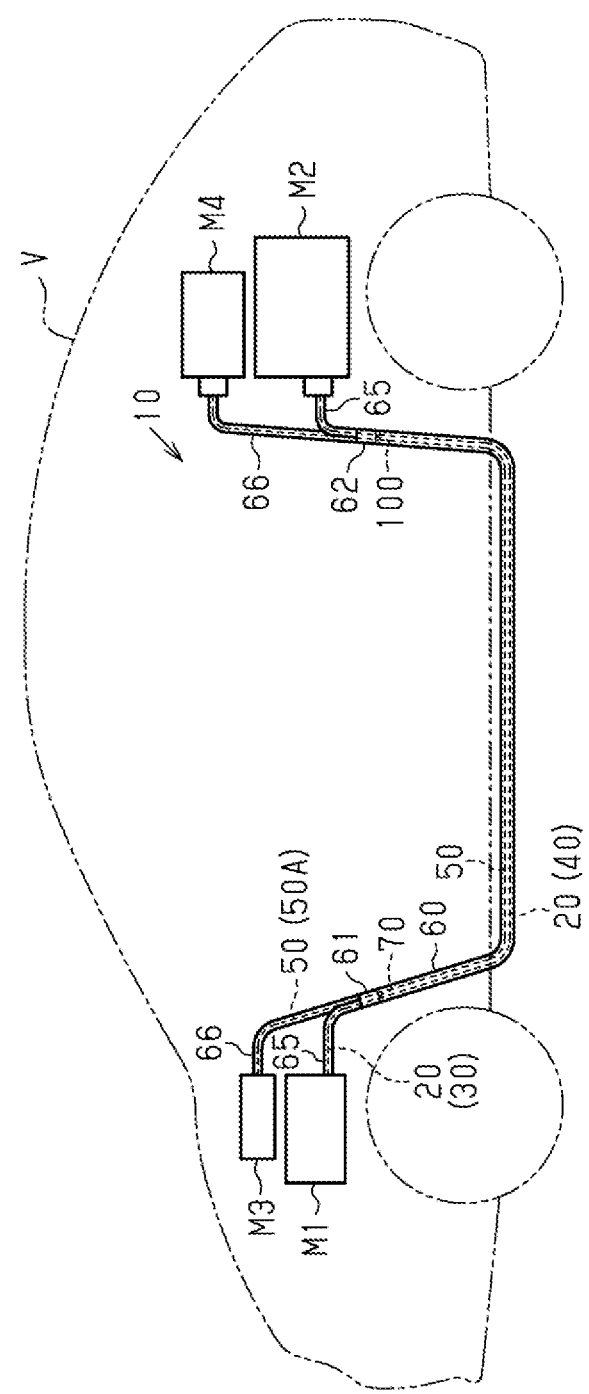
FIG. 1 is a schematic view showing the configuration of a wire harness of an embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

[Description of Embodiments of Present Disclosure]

First, embodiments of the present disclosure are listed and explained.

[1] The wire harness according to the present disclosure includes a first electric wire member including a first flexible wire and a hard wire electrically connected to the first flexible wire, a second electric wire member including a second flexible wire, a tubular member through which the first and second electric wire members extend, and a tubular holder that is attached to a longitudinal end portion of the tubular member and holds the first and second electric wire members therein. The holder has a first housing recess that is located in an inner surface of the holder and houses the second electric wire member.

This configuration houses the second electric wire member in the first housing recess located in the inner surface of the holder, so that the arrangement position of the second electric wire member within the holder is suitably set. Since the arrangement position of at least the second electric wire member of the first and second electric wire members is set, the degree of freedom of the arrangement position of the first electric wire member within the holder is reduced. Thus, the arrangement position of the first electric wire member within the holder is suitably set, so that the position of the first electric wire member relative to the second electric wire member is also set in a suitable manner. As a result, the arrangement positions of the first and second electric wire members within the holder are suitably set. The arrangement positions of the first and second electric wire members are therefore unlikely to be displaced from the intended positions within the holder. This advantageously limits a decrease in ease of the routing of the wire harness.

The term "tubular" as used herein not only indicates that the object has a circumferential wall extending continuously over the entire circumference, but also encompasses that the object is formed by combining multiple parts to assume a tubular shape, and that the object is a C-shaped object that has a cutout section in a part in the circumferential direction. Also, the outer perimeter of a "tubular" object may have the shape of a circle, an ellipse, or a polygon with sharp or rounded corners.

[2] The second electric wire member preferably includes second electric wire members, and the first housing recess preferably includes first housing recesses of the holder, the first housing recesses individually housing the second electric wire members.

This configuration individually houses the multiple second electric wire members in the multiple first housing recesses, allowing the arrangement positions of the second electric wire members within the holder to be individually set. As compared with a configuration in which one first housing recess houses multiple second electric wire members, the arrangement positions of the second electric wire members are suitably set.

[3] The first electric wire member preferably includes first electric wire members, and the holder preferably has a holding portion that sandwiches and holds at least one of the first electric wire members. With this configuration, the holding portion sandwiches and holds at least one first electric wire member, so that the arrangement position of at least one first electric wire member within the holder is suitably set. Since the arrangement position of at least one of the first electric wire members is set, the degree of freedom of the arrangement position of the other first electric wire member within the holder is reduced. This allows the arrangement position of the other first electric wire member within the holder to be suitably set. As a result, the arrangement positions of the first and second electric wire members within the holder are suitably set.

[4] The holder preferably includes a second housing recess that is located in the inner surface of the holder and houses at least one of the first electric wire members. This configuration houses the first electric wire member in the second housing recess located in the inner surface of the holder, so that the arrangement position of the first electric wire member within the holder is suitably set. Thus, the holding portion and the second housing recess allow the arrangement positions of multiple first electric wire members within the holder to be suitably set.

[5] The first electric wire member preferably includes a joint portion at which the first flexible wire is joined to the hard wire, and the holder preferably holds the first electric wire member at opposite sides of the joint portion in a longitudinal direction of the first electric wire member. With this configuration, the holder holds the first electric wire member at opposite sides of the joint portion, so that the joint portion and the first electric wire member are stably held. This advantageously limits movement of the joint portion within the holder. As a result, the joint state of the first flexible wire and the hard wire is suitably maintained.

[6] The holder preferably includes a first holding section, a second holding section, and a connection section. The first holding section holds the first flexible wire, which extends partially in the longitudinal direction of the first electric wire member. The first holding section also holds the second electric wire member. The second holding section holds the hard wire, which extends partially in the longitudinal direction of the first electric wire member. The second holding section also holds the second electric wire member. The connection section connecting the first holding section to the second holding section. With this configuration, the first holding section holds the first flexible wire, and the second holding section holds the hard wire. The holder thus holds the first electric wire member at opposite sides of the joint portion. Additionally, the connection section connects the first holding section to the second holding section, so that the first and second holding sections are formed as a single component.

[7] The first flexible wire preferably includes a core wire including metal strands and a first insulation coating covering an outer circumference of the core wire. The hard wire preferably includes a single core wire including a single conductor and a second insulation coating covering an outer circumference of the single core wire. The joint portion preferably includes a structure in which a section of the core wire that is exposed from an end of the first insulation coating is joined to a section of the single core wire that is exposed from an end of the second insulation coating. The first electric wire member preferably includes a covering member covering the joint portion. The covering member preferably covers an outer circumference of the first insulation coating and an outer circumference of the second insulation coating. The second holding section preferably holds a section of the covering member that covers the outer circumference of the second insulation coating, which extends partially in the longitudinal direction of the first electric wire member. With this configuration, the second holding section holds the covering member covering the outer circumference of the second insulation coating of the hard wire. As such, when the second holding section holds the hard wire, the second holding section is unlikely to be in direct contact with the second insulation coating. This advantageously limits the wear of the second insulation coating, which would otherwise result when the second holding section holds the second insulation coating. For example, even when oscillations or other conditions occur while the second holding section holds the hard wire, the second insulation coating is unlikely to wear in the housing section of the second holding section. Thus, the second insulation coating is less prone to wear, improving the durability of the first electric wire member.

[8] The wire harness preferably includes a fixing member that fixes the first and second electric wire members to the holder. The holder preferably includes a first engagement portion that engages with the tubular member and a fixing portion that is located outside the tubular member. The tubular member preferably includes a second engagement portion that engages with the first engagement portion. The fixing member preferably fixes the first and second electric wire members to the fixing portion. With this configuration, the engagement between the first engagement portion of the holder and the second engagement portion of the tubular member suitably sets the position of the holder relative to the tubular member. As a result, the arrangement positions of the first and second electric wire members within the tubular member are suitably set. Also, the fixing member fixes the first and second electric wire members to the fixing portion, advantageously maintaining the arrangement positions of the first and second electric wire members within the holder.

[9] The holder is preferably a first holder. The wire harness preferably includes the first holder attached to one of longitudinal end portions of the tubular member, and a tubular second holder attached to the other longitudinal end portion of the tubular member. The second holder preferably holds the first and second electric wire members therein. The second holder preferably has a third housing recess that is located in an inner surface of the second holder and houses the second electric wire member. This configuration attaches the first and second holders to the respective longitudinal ends of the tubular member. Since the first holder houses the second electric wire member in the first housing recess, which is located in the inner surface of the first holder, the arrangement position of the second electric wire member within the first holder is suitably set. This suitably sets the arrangement positions of the first and second electric wire members within the first holder. Likewise, since the second holder houses the second electric wire member in the third housing recess, which is located in the inner surface of the second holder, the arrangement position of the second electric wire member within the second holder is suitably set. This suitably sets the arrangement positions of the first and second electric wire members within the second holder. As a result, the arrangement positions of the first and second electric wire members are suitably set at both longitudinal ends of the tubular member.

[Details of Embodiments of Present Disclosure]

Specific examples of a wire harness according to the present disclosure are now described with reference to the drawings. In the drawings, for convenience of explanation, some portions of the configurations may be exaggerated or simplified. In addition, portions may be drawn to different scales among the drawings. As used herein, the term "perpendicular" not only indicates that the object is strictly perpendicular, but also encompasses that the object is substantially perpendicular provided that the advantageous effect of the present embodiment is achieved. The present invention is not limited to the following examples, and it is intended that the present invention covers all modifications within the spirit and scope of the invention as defined in the claims and their equivalent.

First Embodiment

Referring to FIGS. 1 to 6, a first embodiment of a wire harness is now described.

Configuration of Wire Harness 10

As shown in FIG. 1, a wire harness 10 electrically connects two or three or more electric devices M1, M2, M3, and M4. The wire harness 10 may be mounted on a vehicle V, such as a hybrid vehicle or an electric vehicle. The wire harness 10 includes one or more (two in this embodiment) electric wire members 20, which electrically connect the electric device M1 to the electric device M2, and one or more (two in this embodiment) electric wire members 50, which electrically connect the electric device M3 to the electric device M4. The wire harness 10 may include a tubular member 60, through which the electric wire members 20 and 50 extend, tubular exterior members 65, which surround the electric wire members 20 drawn out from the tubular member 60, and tubular exterior members 66, which surround the electric wire members 50 drawn out from the tubular member 60. The wire harness 10 may include a holder 70 provided at one end portion 61 in the longitudinal direction (axial direction) of the tubular member 60, and a holder 100 provided at the other longitudinal end portion 62 of the tubular member 60. The tubular member 60 and the exterior members 65 and 66 protect the electric wire members 20 and 50 housed therein from flying objects and water droplets.

The wire harness 10 may have paths bent in a two-dimensional shape or a three-dimensional shape. The wire harness 10 may have multiple branched paths. For example, in the wire harness 10, the electric wire members 20 and 50 drawn out from the tubular member 60 are branched into different paths.

Configuration of Electric Wire Member 20

Each electric wire member 20 may be routed from the electric device M1 to the electric device M2 with its portion in the longitudinal direction extending under the floor of the vehicle V. One end of the electric wire member 20 is connected to the electric device M1, and the other end is connected to the electric device M2. For example, the electric device M1 may be an inverter located in the front side of the vehicle V, and the electric device M2 may be a high-voltage battery located rearward of the vehicle V than the electric device M1. The inverter may be connected to a motor for driving wheels, which is the power source for running the vehicle. The inverter generates AC power from the DC power of the high-voltage battery and supplies the AC power to the motor. The high-voltage battery may be a battery capable of supplying a voltage of 100 volts or more.

Figure 2:
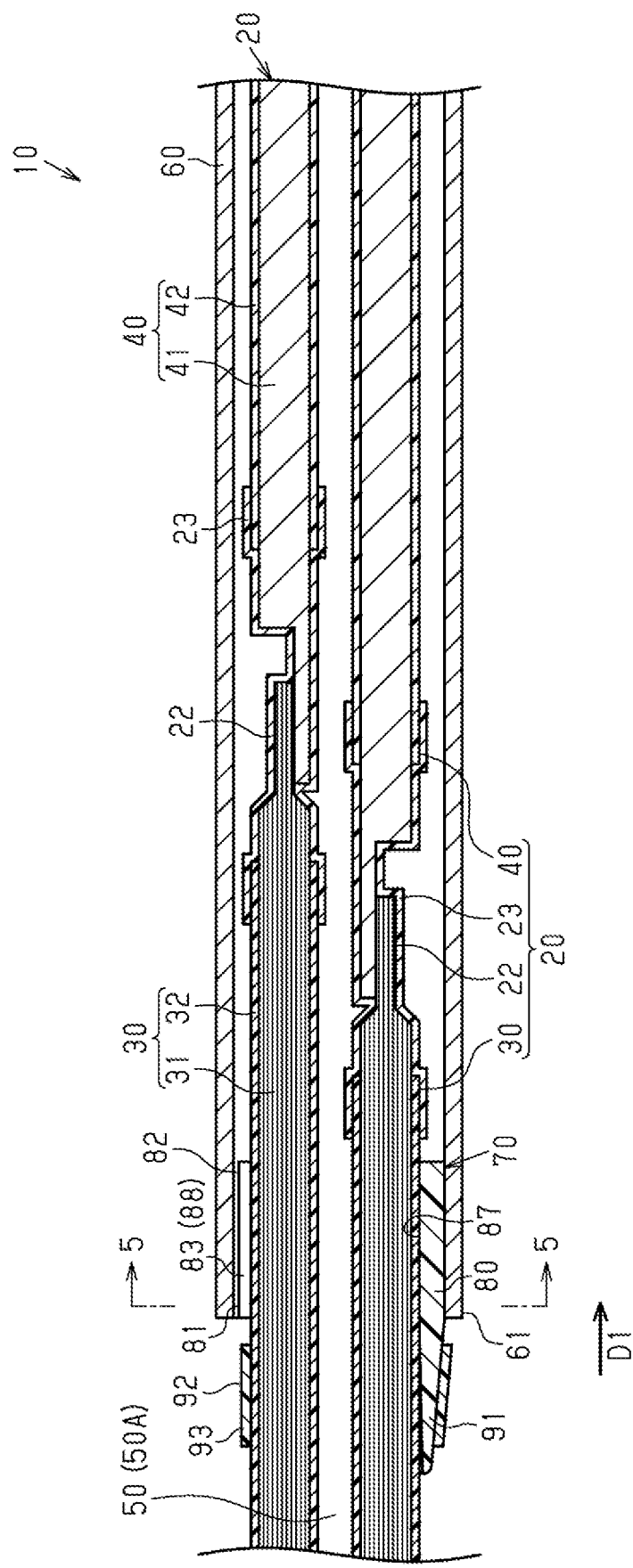
FIG. 2 is a schematic cross-sectional view showing a wire harness of a first embodiment.

As shown in FIG. 2, each electric wire member 20 includes a flexible wire 30 and a hard wire 40 electrically connected to the flexible wire 30. The electric wire member 20 is formed by electrically connecting the flexible wire 30 and the hard wire 40, which differ in type, in the longitudinal direction of the electric wire member 20. The electric wire member 20 includes a joint portion 22 in which the flexible wire 30 and the hard wire 40 are joined, and a covering member 23, which covers the outer perimeter of the joint portion 22. In each electric wire member 20 of the present embodiment, flexible wires 30 are connected to opposite longitudinal ends of a hard wire 40. For example, the middle section in the longitudinal direction of the electric wire member 20 is formed by a hard wire 40, and the two end sections in the longitudinal direction of the electric wire member 20 are formed by flexible wires 30. The flexible wires 30 and the hard wire 40 may be high-voltage electric wires that can accommodate high voltage and large current. The flexible wires 30 and the hard wire 40 may be shielded electric wires having an electromagnetic shielding structure, or non-shielded electric wires that do not have an electromagnetic shielding structure. The flexible wires 30 and the hard wire 40 of the present embodiment are non-shielded electric wires.

Configuration of Flexible Wire 30

Each flexible wire 30 may be more flexible than the hard wire 40. The flexible wire 30 may have higher bending capability than the hard wire 40.

The flexible wire 30 has a core wire 31, which is formed by multiple metal strands, and an insulation coating 32, which covers the outer circumference of the core wire 31. The core wire 31 may be a stranded wire formed by twisting multiple metal strands, or a braided member in which multiple metal strands are braided into a tube. The core wire 31 of this embodiment is a stranded wire. The core wire 31 may be made of a metal material, such as an iron-based or aluminum-based metal.

The shape of a cross-section of the core wire 31 that is perpendicular to the longitudinal direction of the core wire 31 (i.e., the transverse sectional shape) may be any shape. Examples of the transverse sectional shape of the core wire 31 include circular, semicircular, polygonal, square, and flattened shapes. The transverse sectional shape of the core wire 31 of the present embodiment is circular.

The insulation coating 32 covers the outer surface of the core wire 31 over its entire circumference. The insulation coating 32 is made of an insulating material such as a synthetic resin. The insulation coating 32 may be made of a polyolefin resin such as cross-linked polyethylene or cross-linked polypropylene. The insulation coating 32 may be formed by extrusion (extrusion coating) on the core wire 31.

Configuration of Hard Wire 40

The hard wire 40 may have higher bending stiffness than the flexible wire 30. The hard wire 40 may have a stiffness that maintains the shape corresponding to the routing path of the electric wire member 20. The hard wire 40 may have a stiffness that, when mounted on the vehicle V (FIG. 1), maintains its linear or bent state resisting vibrations or other conditions of the vehicle V. For example, when the hard wire 40 is routed in a bent path, the hard wire 40 is subjected to bending process and the bent shape is maintained.

The hard wire 40 may include a single core wire 41, which is formed by a single conductor, and an insulation coating 42, which covers the outer circumference of the single core wire 41. The single core wire 41 may be a columnar conductor formed by a single metal bar having the shape of a solid column, or a tubular conductor having a hollowed interior. The single core wire 41 of this embodiment is a columnar conductor. The single core wire 41 may be made of a metal material, such as an iron-based or aluminum-based metal. The material of the single core wire 41 may be the same type as the material of the core wire 31, or may be different from the material of the core wire 31. The single core wire 41 may be formed by extrusion. The single core wire 41 may have any transverse sectional shape. The transverse sectional shape of the single core wire 41 of the present embodiment is circular.

The insulation coating 42 may cover the outer surface of the single core wire 41 over its entire circumference. The insulation coating 42 may be made of an insulating material such as a synthetic resin. The insulation coating 42 may be made of a polyolefin resin such as cross-linked polyethylene or cross-linked polypropylene. The insulation coating 42 may be formed by extrusion on the single core wire 41. Furthermore, the insulation coating 42 may be a heat-shrinkable tube or a rubber tube.

Configuration of Joint Portion 22

At the joint portion 22, a core wire 31 and a single core wire 41 are joined. Specifically, at a longitudinal end portion of a flexible wire 30, the insulation coating 32 is peeled off by a certain length from the end of the flexible wire 30, exposing the end portion of the core wire 31. Also, at a longitudinal end portion of the hard wire 40, the insulation coating 42 is peeled off by a certain length from the end of the hard wire 40, exposing the end portion of the single core wire 41. The joint portion 22 joins the end portion of the single core wire 41, which is exposed from the insulation coating 42, to the end portion of the core wire 31, which is exposed from the insulation coating 32. For example, in the joint portion 22, the core wire 31 and the single core wire 41 are placed over each other in the radial direction, that is, in a direction intersecting the longitudinal direction of the core wire 31 and the single core wire 41, and thus joined. The core wire 31 and the single core wire 41 may be joined by other joining techniques. For example, the core wire 31 and the single core wire 41 may be joined by ultrasonic welding or laser welding.

Among multiple electric wire members 20, the respective joint portions 22 may be located at different positions in the longitudinal direction of the electric wire members 20. That is, the joint portions 22 are positioned so as not to be aligned with one another in a radial direction of the flexible wire 30 and the hard wire 40.

Configuration of Covering Member 23

The covering member 23 covers the outer perimeter of the joint portion 22. The covering member 23 may have the shape of an elongated tube. The covering member 23 may cover the core wire 31 exposed from the insulation coating 32 and the single core wire 41 exposed from the insulation coating 42. The covering member 23 may extend from the end portion of the insulation coating 32 to the end portion of the insulation coating 42. For example, one end portion of the covering member 23 covers the outer surface of the end portion of the insulation coating 32, and the other end portion of the covering member 23 may cover the outer surface of the end portion of the insulation coating 42. The covering member 23 surrounds the entire outer circumferences of the flexible wire 30 and the hard wire 40. The covering member 23 may function to maintain the electrical insulation for the joint portion 22 and the sections of the core wire 31 and the single core wire 41 exposed from the insulation coatings 32 and 42. In addition, the covering member 23 functions to waterproof the joint portion 22 and the sections of the core wire 31 and the single core wire 41 exposed from the insulation coatings 32 and 42.

The covering member 23 may be a shrinkable tube, a rubber tube, a plastic mold, a hot melt adhesive, or a tape member, for example. The covering member 23 of the present embodiment is a heat-shrinkable tube. The covering member 23 may be made of a synthetic resin containing a polyolefin resin, such as cross-linked polyethylene or cross-linked polypropylene, as a principal component.

The hard wire 40 may be placed inside the tubular member 60. The hard wire 40 may be placed inside the tubular member 60 over the length in the longitudinal direction of the hard wire 40. The joint portion 22 may be placed inside the tubular member 60. A longitudinal end portion of the flexible wire 30 may be placed inside the tubular member 60. The flexible wire 30 may be drawn out of the tubular member 60 from the end portion 61 of the tubular member 60. Although not shown, at an end portion 62 (FIG. 1) of the tubular member 60, a joint portion 22, at which a longitudinal end of the hard wire 40 is joined to a longitudinal end of a flexible wire 30, is also placed within the tubular member 60. This flexible wire 30 is drawn out of the tubular member 60 from the end portion 62 of the tubular member 60.

Configuration of Electric Wire Member 50

As shown in FIG. 1, each electric wire member 50 may be routed from the electric device M3 to the electric device M4 with its portion in the longitudinal direction extending under the floor of the vehicle V. One end of the electric wire member 50 is connected to the electric device M3, and the other end is connected to the electric device M4. For example, the electric device M3 may be a relay box located in the front side of the vehicle V, and the electric device M4 may be a low-voltage battery located in the rear side of the vehicle V. The relay box distributes the voltage supplied from the low-voltage battery to various devices mounted on the vehicle V. The low-voltage battery is a battery capable of supplying a lower voltage (e.g., 12 volts) than a high-voltage battery.

Figure 3:
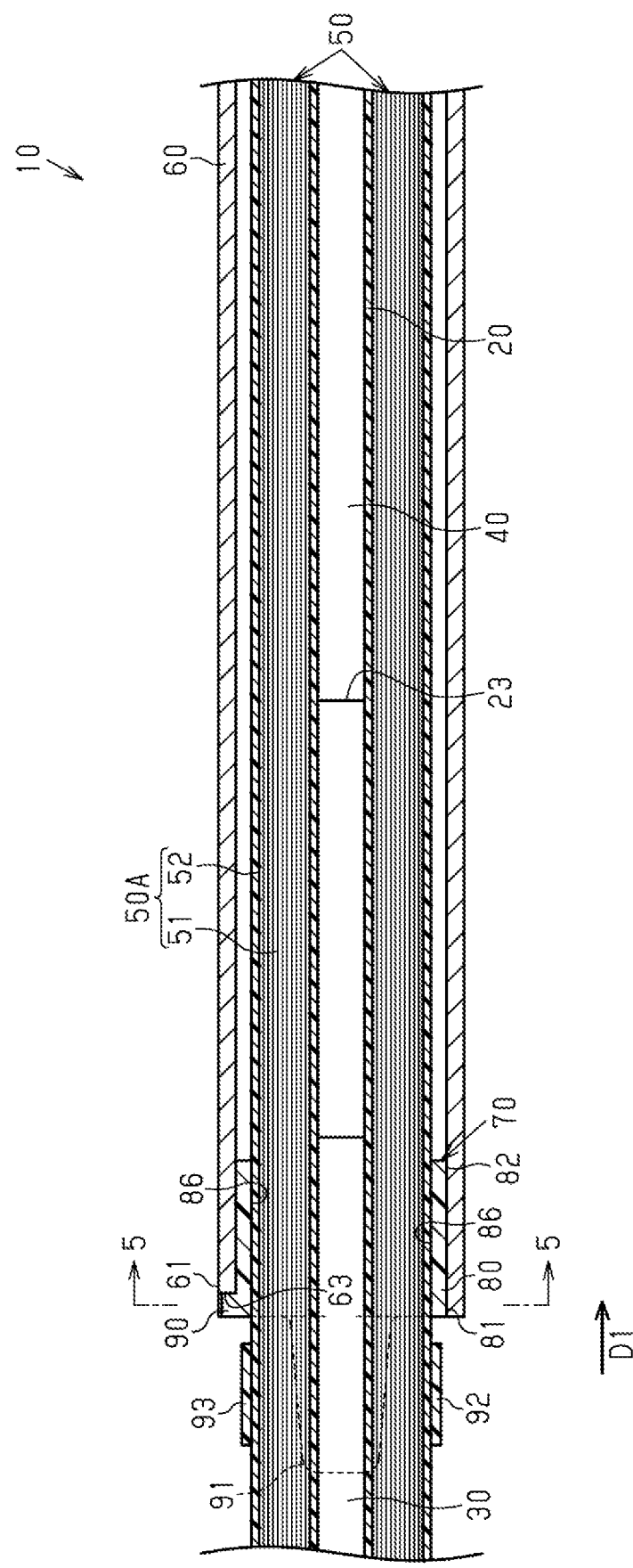
FIG. 3 is a schematic cross-sectional view showing the wire harness of the first embodiment.

As shown in FIG. 3, the electric wire members 50 are flexible wires 50A. That is, each electric wire member 50 is formed only by a single flexible wire 50A. The flexible wire 50A extends over the length of the electric wire member 50 in the longitudinal direction. The flexible wire 50A may be a low-voltage electric wire. The flexible wire 50A may be a shielded electric wire having an electromagnetic shielding structure, or a non-shielded electric wire that does not have an electromagnetic shielding structure. The flexible wire 50A of the present embodiment is a non-shielded electric wire.

Configuration of Flexible Wire 50A

Each flexible wire 50A may be more flexible than the hard wire 40. The flexible wire 50A may have higher bending capability than the hard wire 40.

The flexible wire 50A has a core wire 51, which is formed by multiple metal strands, and an insulation coating 52, which covers the outer circumference of the core wire 51. The core wire 51 may be a stranded wire or a braided member. The core wire 51 of this embodiment is a stranded wire. The core wire 51 may be made of a metal material, such as an iron-based or aluminum-based metal. The core wire 51 may have any transverse sectional shape. The transverse sectional shape of the core wire 51 of the present embodiment is circular.

The insulation coating 52 covers the outer surface of the core wire 51 over its entire circumference, for example. The insulation coating 52 may be made of an insulating material such as a synthetic resin. The insulation coating 52 may be made of a polyolefin resin such as cross-linked polyethylene or cross-linked polypropylene. The insulation coating 52 may be formed by extrusion on the core wire 51.

As shown in FIG. 1, the middle sections in the longitudinal direction of the flexible wires 50A may be placed inside the tubular member 60. For example, these middle sections of the flexible wires 50A may be housed inside the tubular member 60 together with the electric wire members 20. The two longitudinal ends of each flexible wire 50A may be drawn out of the tubular member 60 from the longitudinal end portions 61 and 62 of the tubular member 60.

Configuration of Tubular Member 60

The tubular member 60 may have the shape of an elongated tube. The tubular member 60 of the present embodiment has the shape of a circular tube. The tubular member 60 may be provided in the middle section of the wire harness 10 in the longitudinal direction. The tubular member 60 may house the middle sections in the longitudinal direction of the electric wire members 20 and 50. The tubular member 60 may surround the entire circumferences of the electric wire members 20 and 50. The tubular member 60 may be a metal pipe, a plastic pipe, a plastic corrugated tube, a rubber waterproof cover, or a combination thereof. The metal pipe may be made of a metal material, such as an aluminum-based or copper-based metal. The plastic pipe or the corrugated tube may be made of a conductive resin material or a non-conductive resin material. The resin material may be a synthetic resin such as polyolefin, polyamide, polyester, and ABS resin. The tubular member 60 of the present embodiment is a metal pipe.

Configuration of Exterior Members 65 and 66

The exterior members 65 and 66 have the shape of an elongated tube. The exterior members 65 and 66 may be placed at opposite longitudinal ends of the wire harness 10. Each exterior member 65 may house longitudinal ends of the electric wire members 20. The exterior member 65 may house only the electric wire members 20 of the electric wire members 20 and 50 drawn out from the tubular member 60. The exterior member 65 may surround the entire circumferences of the electric wire members 20. The exterior member 65 may surround the entire circumferences of the flexible wires 30, which extend partially in the longitudinal direction of the electric wire members 20. Each exterior member 66 may house longitudinal ends of the electric wire members 50. The exterior member 66 may house only the electric wire members 50 of the electric wire members 20 and 50 drawn out from the tubular member 60. The exterior member 66 may surround the entire circumferences of the electric wire members 50. The exterior members 65 and 66 may be corrugated tubes or waterproof covers, for example.

In the wire harness 10, the tubular member 60 houses the electric wire members 20 and 50 together, and the electric wire members 20 and 50 drawn out of the tubular member 60 are branched into different paths. Then, the exterior members 65 and 66 house the electric wire members 20 and 50, respectively, which are branched into different paths.

Configuration of Holders 70 and 100

A holder 70 may be attached to the end portion 61, which is one of the longitudinal end portions 61 and 62 of the tubular member 60 that is closer to the electric devices M1 and M3. A holder 100 may be attached to the end portion 62, which is one of the longitudinal end portions 61 and 62 of the tubular member 60 that is closer to the electric devices M2 and M4. The holders 70 and 100 are inserted in the tubular member 60 and thus attached to the end portions 61 and 62, respectively, of the tubular member 60. The holders 70 and 100 hold multiple electric wire members 20 and multiple electric wire members 50. That is, the holders 70 and 100 hold the electric wire members 20 and 50 extending through the tubular member 60. The holders 70 and 100 may be made of a synthetic resin, such as polyolefin, polyamide, polyester, and ABS resin. The holders 70 and 100 function to set the arrangement positions (arrangements) of the multiple electric wire members 20 and 50 and maintain these arrangement positions. The holders 70 and 100 function to set the arrangement positions of the electric wire members 20 and 50 relative to the tubular member 60 and maintain these arrangement positions. When placed inside the tubular member 60, the holders 70 and 100 function to protect the electric wire members 20 and 50 from the edges at the ends of the tubular member 60.

Configuration of Holder 70

As shown in FIG. 2, the holder 70 holds the flexible wires 30, which extend partially in the longitudinal direction of the electric wire members 20, for example. The holder 70 may be spaced apart from the joint portion 22 in the longitudinal direction of the electric wire member 20.

Figure 4:
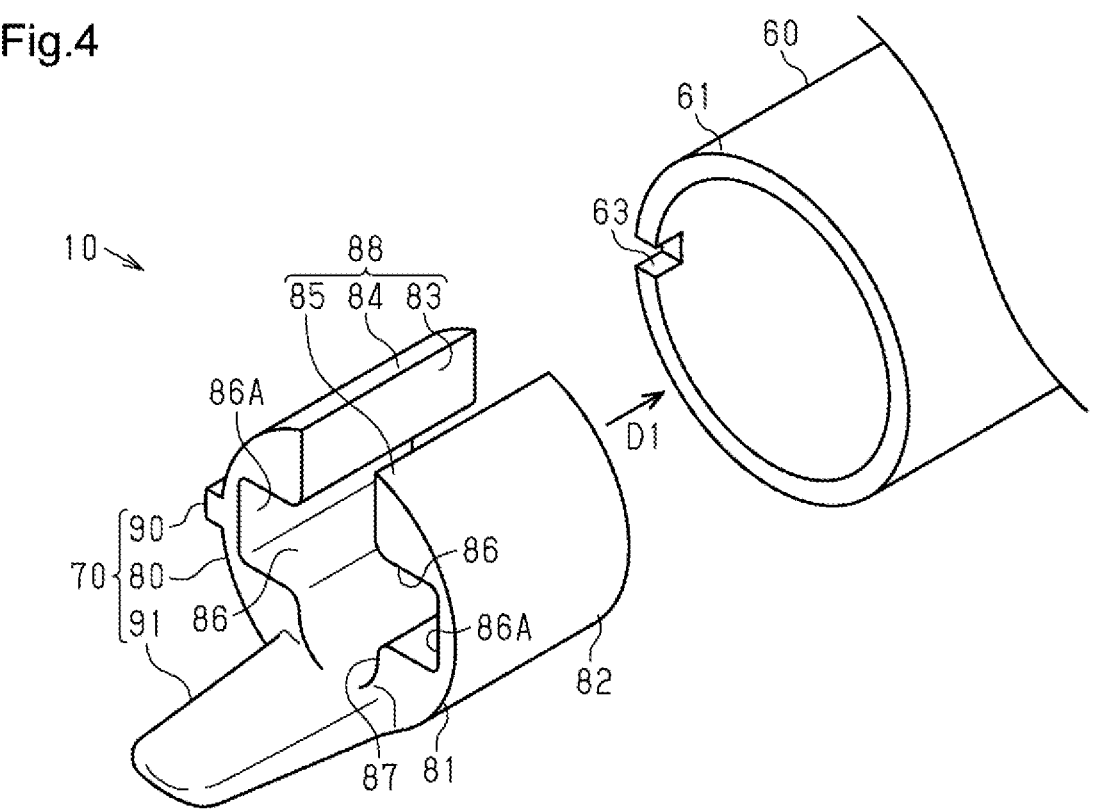
FIG. 4 is an exploded perspective view schematically showing the wire harness of the first embodiment.

As shown in FIG. 4, the holder 70 includes a tubular main body 80, a protrusion 90 formed on the outer surface of the main body 80, and a fixing portion 91 extending from an axial end surface of the main body 80. The holder 70 may be a single component in which the main body 80, the protrusion 90, and the fixing portion 91 are integrally formed.

Configuration of Main Body 80

The main body 80 is fitted into the tubular member 60. The main body 80 may be inserted into the tubular member 60 in an insertion direction D1. For example, the main body 80 is inserted into the tubular member 60 in the insertion direction D1 from the side corresponding to the electric devices M1 and M3 (see FIG. 1). The main body 80 has end portions 81 and 82 in the axial direction of the main body 80. The end portion 81 is located at the trailing side in the insertion direction D1 (the side corresponding to the electric devices M1 and M3). The end portion 82 is located at the leading side of the insertion direction D1 (the side corresponding to the tubular member 60). The main body 80 is tubular and has an outer surface having a shape corresponding to the inner surface of the tubular member 60, for example. The main body 80 of the present embodiment has the shape of a circular tube. The outer diameter of the main body 80 is slightly smaller than the inner diameter of the tubular member 60.

The main body 80 may have a C-shaped transverse section. The main body 80 has a slit 83 extending in the axial direction of the main body 80 at a position in the circumferential direction of the main body 80, for example. The slit 83 extends over the axial length of the main body 80. In other words, the main body 80 has an edge 84 and an edge 85, which is spaced apart from the edge 84 in the circumferential direction of the main body 80. The slit 83 is formed between the edges 84 and 85 in the main body 80.

The main body 80 has housing recesses 86 for housing the electric wire members 50 (see FIG. 3). The main body 80 may have two housing recesses 86 for individually housing the two electric wire members 50. The housing recesses 86 are located in the inner surface of the main body 80. The housing recesses 86 extend from the inner surface of the main body 80 outward in the radial direction of the main body 80. The housing recesses 86 extend in the axial direction of the main body 80 over the axial length of the main body 80.

Figure 5:
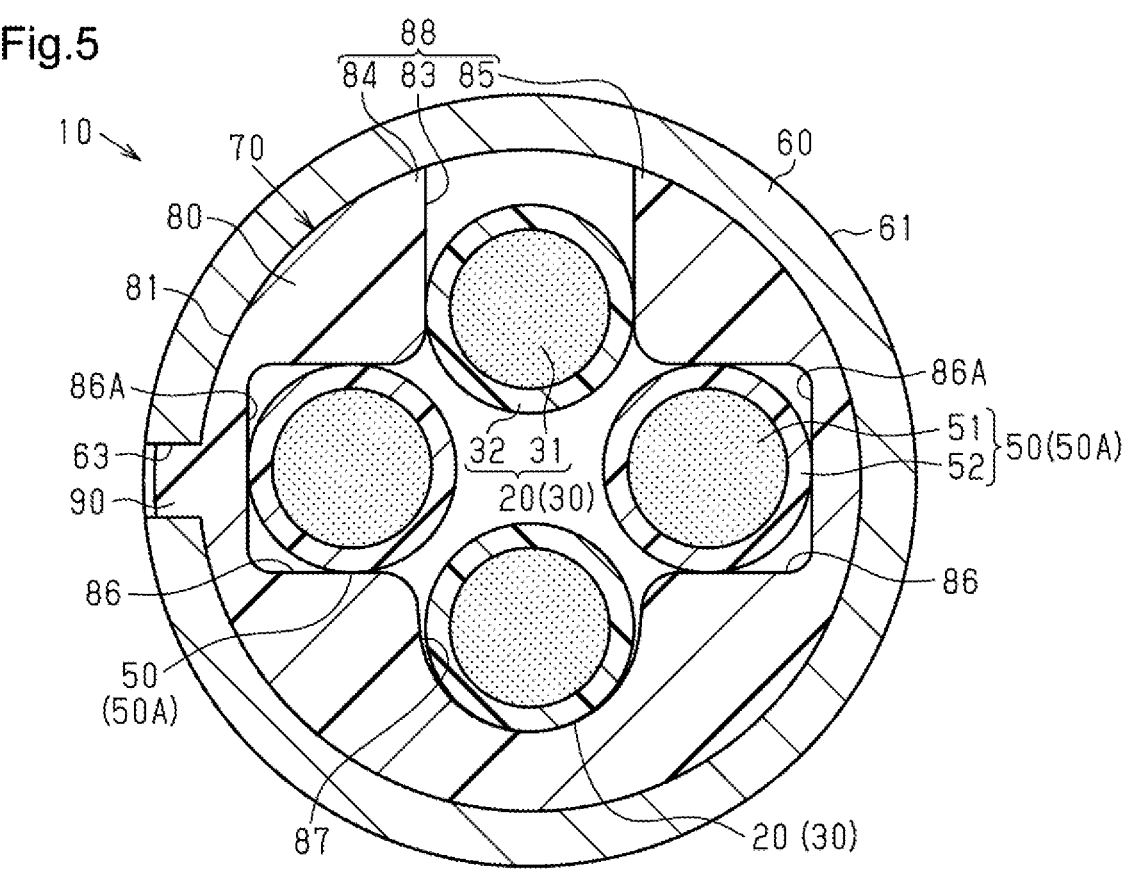
FIG. 5 is a schematic view showing a transverse section of the wire harness of the first embodiment (a cross-sectional view taken along line 5-5 in FIGS. 2 and 3).

As shown in FIG. 5, each housing recess 86 may be sized to house a part of an electric wire member 50. The inner surface of the housing recess 86 may be in contact with the outer surface of the insulation coating 52 of the electric wire member 50. The inner surface of the housing recess 86 may include a base surface 86A having a linear transverse sectional shape. The transverse sectional shape of the base surface 86A may extend linearly in a direction (an up-down direction as viewed in the drawing) that is perpendicular to a direction in which the two housing recesses 86 are arranged (a right-left direction as viewed in the drawing). The two housing recesses 86 face each other with the central axis of the main body 80 located in between, for example. The two housing recesses 86 may be formed such that the base surfaces 86A face each other with the central axis of the main body 80 located in between.

As used herein, the term "face" indicates that surfaces or members are in front of each other and encompasses not only a state in which they are completely in front of each other, but also a state in which they are partially in front of each other. Also, the term "face" as used herein indicates a state in which another member is present between two members, and also a state in which no object is present between two members.

The main body 80 may also include a housing recess 87 for housing an electric wire member 20 and a holding portion 88 for sandwiching and holding an electric wire member 20. In the main body 80, the housing recess 87 houses one of the two electric wire members 20, and the holding portion 88 sandwiches and holds the other electric wire member 20, for example.

The housing recess 87 is located in the inner surface of the main body 80. The housing recess 87 extends from the inner surface of the main body 80 outward in the radial direction of the main body 80. The inner surface of the housing recess 87 may be a curved surface of an arcuate shape. The inner surface of the housing recess 87 may be a curved surface corresponding to the outer surface of the flexible wire 30 of the electric wire member 20. The housing recess 87 may be sized to house a part of the flexible wire 30. The inner surface of the housing recess 87 is in contact with the outer surface of the insulation coating 32 of the flexible wire 30. The housing recess 87 is on an opposite side of the central axis of the main body 80 from the slit 83, that is, the housing recess 87 is at a position separated from the slit 83 by about 7C rad in the circumferential direction of the main body 80, for example. As shown in FIG. 4, the housing recess 87 extends in the axial direction of the main body 80 over the axial length of the main body 80.

As shown in FIG. 5, the holding portion 88 may include the edges 84 and 85 in the circumferential direction of the main body 80 and the slit 83. In the holding portion 88, the surfaces of the edges 84 and 85 face each other. The surfaces of the edges 84 and 85 form the inner surfaces defining the slit 83. The distance between the surfaces of the edges 84 and 85, that is, the width of the slit 83 may be smaller than the diameter of the flexible wire 30. The main body 80 is elastically deformable so that the width of the slit 83 can be increased. For example, when a flexible wire 30 is inserted into the slit 83, the holding portion 88 is elastically deformed to increase the width of the slit 83. At this time, the surfaces of the edges 84 and 85 sandwich the flexible wire 30, allowing the holding portion 88 to hold the single electric wire member 20. The surfaces of the edges 84 and 85 are in contact with the outer surface of the insulation coating 32 of the flexible wire 30. The holding portion 88 (the slit 83) and the housing recess 87 may be aligned in a direction (an up-down direction as viewed in the drawing) that is perpendicular to a direction in which the two housing recesses 86 are arranged (a right-left direction as viewed in the drawing) in a transverse section the main body 80.

As shown in FIG. 4, the holding portion 88 extends in the axial direction of the main body 80 over the axial length of the main body 80. The surfaces of the edges 84 and 85 are in contact with the outer surface of the flexible wire 30 (see FIG. 2) over the axial length of the main body 80.

As shown in FIG. 5, within the main body 80, the two housing recesses 86 individually house two electric wire members 50, the housing recess 87 houses one electric wire member 20, and the holding portion 88 sandwiches the last electric wire member 20. Two electric wire members 50 are housed in the housing recesses 86 and thus held in the main body 80. One electric wire member 20 is housed in the housing recess 87 and thus held in the main body 80. The last electric wire member 20 is sandwiched by the holding portion 88 and thus held in the main body 80. As a result, the arrangement positions of the two electric wire members 20 and the two electric wire member 50 within the main body 80 of the holder 70 are set, and these arrangement positions are maintained.

Configuration of Protrusion 90

As shown in FIG. 4, the protrusion 90 may be provided on the outer surface of the end portion 81 of the main body 80. The protrusion 90 may be provided only on the outer surface of the end portion 81, which extends partially in the axial direction of the main body 80. The protrusion 90 is provided only on a part of the outer surface of the end portion 81 in the circumferential direction of the main body 80. The protrusion 90 extends from the outer surface of the end portion 81 outward in the radial direction of the main body 80. The protrusion 90 may correspond to a cutout section 63 formed in the end portion 61 of the tubular member 60. The cutout section 63 may be formed in the longitudinal end surface of the tubular member 60. The cutout section 63 extends from the longitudinal end surface of the tubular member 60 in the insertion direction D1. The cutout section 63 may be provided in a part in the circumferential direction of the tubular member 60. The cutout section 63 may extend over the length in the thickness direction of the tubular member 60 in a part in the circumferential direction of the tubular member 60. The cutout section 63 is sized so that the protrusion 90 is fitted into the cutout section 63.

When the main body 80 is inserted into the tubular member 60, the protrusion 90 is fitted in the cutout section 63. At this time, the protrusion 90 is in contact with the inner surface defining the cutout section 63. As shown in FIG. 5, the protrusion 90 faces the inner surface of the cutout section 63 in the circumferential direction of the tubular member 60. This limits movement of the holder 70 within the tubular member 60 in the circumferential direction of the tubular member 60. That is, the engagement between the protrusion 90 and the cutout section 63 limits rotation of the holder 70 about the central axis of the main body 80 within the tubular member 60. This limits movement of the holder 70 relative to the tubular member 60 in the circumferential direction of the tubular member 60, fixing the position of the holder 70 relative to the tubular member 60. Accordingly, the positions of the electric wire members 20 and 50, whose arrangement positions are set within the holder 70, are fixed relative to the tubular member 60.

Configuration of Fixing Portion 91

As shown in FIG. 4, the fixing portion 91 extends in the axial direction of the main body 80 from the axial end surface of the main body 80. The fixing portion 91 is provided on the end surface of the end portion 81 of the main body 80. The fixing portion 91 projects away from the main body 80. The fixing portion 91 may be formed only in a part in the circumferential direction of the main body 80. The fixing portion 91 may be located at a position that is different from the slit 83 in the circumferential direction of the main body 80. The fixing portion 91 may be located at a position that is separated from the slit 83 by about 7C rad in the circumferential direction of the main body 80.

As shown in FIG. 2, the fixing portion 91 is located outside the tubular member 60. The fixing portion 91 may be projected from the longitudinal end surface of the tubular member 60 and away from the tubular member 60. The fixing portion 91 may have the shape of a thin plate. The fixing portion 91 has an inner surface facing the electric wire members 20 and 50 (a surface facing upward as viewed in the drawing) and an outer surface that is opposite to the inner surface. As shown in FIG. 4, the inner and outer surfaces of the fixing portion 91 may be curved. The inner surface of the fixing portion 91 may be integral and continuous with the inner surface of the housing recess 87.

Configuration of Fixing Member 92

As shown in FIG. 2, the wire harness 10 may include a fixing member 92 for fixing the multiple electric wire members 20 and 50 to the holder 70. The fixing member 92 may fix the electric wire members 20 and 50 to the fixing portion 91 of the holder 70.

The fixing member 92 may be formed by winding a tape member 93 around the fixing portion 91 and the electric wire members 20 and 50. The tape member 93 may have an adhesive layer on one surface. The tape member 93 may be wound around the fixing portion 91 and the electric wire members 20 and 50 with the adhesive layer facing inward in the radial direction of the main body 80. The tape member 93 may be wound around the fixing portion 91 and the electric wire members 20 and 50 multiple times. The tape member 93 may tighten the fixing portion 91 and the electric wire members 20 and 50 together. The tape member 93 may cover and tighten the outer surface of the fixing portion 91 and the outer surfaces of the electric wire members 20 and 50 in directions in which the fixing portion 91 and the electric wire members 20 and 50 approach one another.

The tape member 93 fixing the electric wire members 20 and 50 to the fixing portion 91 limits movement of the holder 70 relative to the electric wire members 20 and 50 in the longitudinal direction of the electric wire members 20 and 50. This also limits movement of the electric wire members 20 and 50 relative to the holder 70 within the main body 80. The arrangement positions of the electric wire members 20 and 50 within the main body 80 are thus maintained in a more suitable manner.

Configuration of Holder 100

Figure 6:
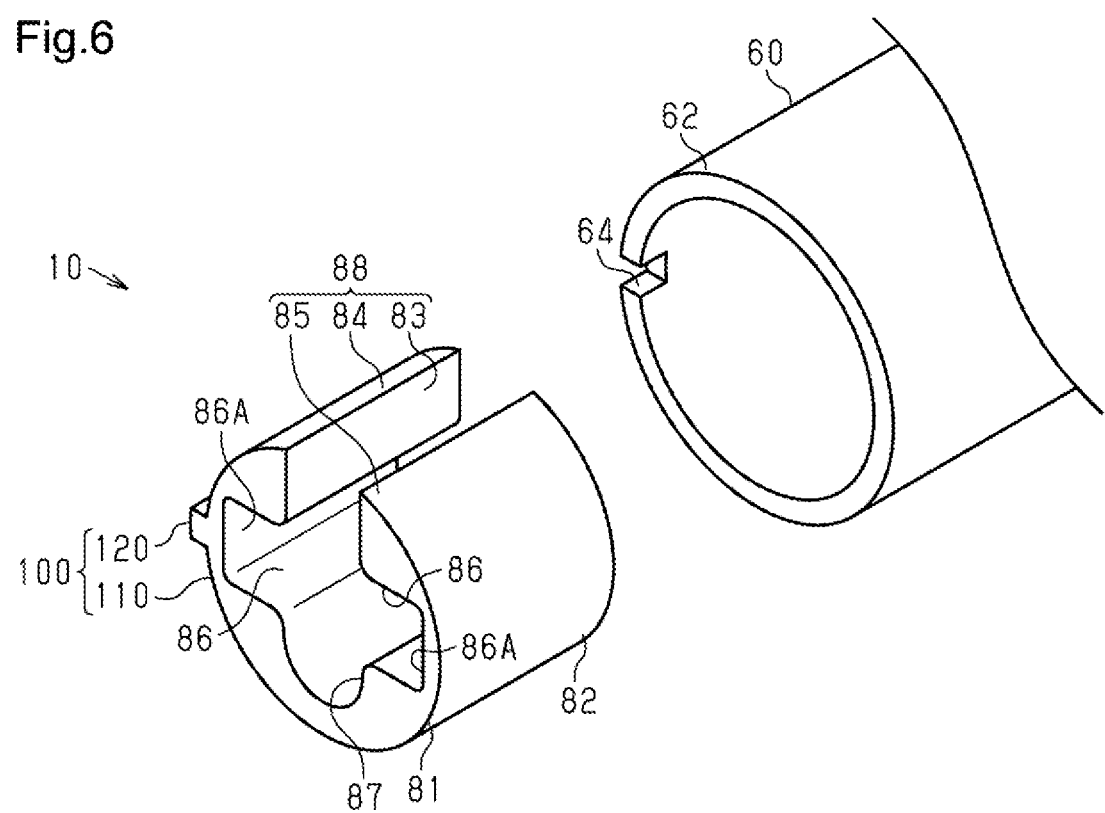
FIG. 6 is an exploded perspective view schematically showing the wire harness of the first embodiment.

As shown in FIG. 6, the holder 100 includes a tubular main body 110 and a protrusion 120 formed on the outer surface of the main body 110. The holder 100 may be a single component in which the main body 110 and the protrusion 120 are integrally formed.

The holder 100 has the same structure as the holder 70 shown in FIG. 4, except that the holder 100 does not have the fixing portion 91 (see FIG. 4). That is, the main body 110 has the same structure as the main body 80 shown in FIG. 4, and the protrusion 120 has the same structure as the protrusion 90 shown in FIG. 4. For example, the main body 110 has multiple housing recesses 86, a housing recess 87, and a holding portion 88. The main body 110 is fitted into the end portion 62 of the tubular member 60. The protrusion 120 is fitted into a cutout section 64 formed in the end portion 62 of the tubular member 60. The cutout section 64 is formed in the same manner as the cutout section 63 shown in FIG. 4. Each housing recess 86 of the holder 100 is an example of a third housing recess.

When the tubular member 60 of the wire harness 10 shown in FIG. 1 is bent, the bending process starts at the longitudinal end of the tubular member 60 corresponding to the electric devices M1 and M3 and proceeds toward the other end corresponding to the electric devices M2 and M4. In the wire harness 10, the holder 70 at the end where the bending process starts has the fixing portion 91 (FIG. 4), and the holder 100 at the end where the bending process ends does not have the fixing portion 91. By forming the fixing portion 91 in the holder 70 and fixing the electric wire members 20 and 50 to the fixing portion 91 with the fixing member 92 (FIG. 2), the amounts of the electric wire members 20 and 50 that are drawn out from the tubular member 60 are advantageously maintained at the intended values during the bending process. In addition, since the holder 100 located at the end where the bending process ends does not have a fixing portion 91, the holder 100 and the electric wire members 20 and 50 are not fixed together with a fixing member 92 (FIG. 2). This increases the degree of freedom at one longitudinal end of each electric wire member 20, 50. Accordingly, as compared with a configuration in which both longitudinal ends of each electric wire member 20, 50 are fixed to the holders 70 and 100 with fixing members 92, one end of the electric wire member 20, 50 has a higher degree of freedom, allowing the amount of the electric wire member 20, 50 that is drawn out from the tubular member 60 to be maintained at the intended value in a more suitable manner.

The present embodiment has the following advantages.

(1) The housing recesses 86 for housing the electric wire members 50 are formed in the inner surface of the holder 70. According to this configuration, since the housing recesses 86 house the electric wire members 50, the arrangement positions of the electric wire members 50 within the holder 70 are suitably set. Thus, the arrangement positions of the electric wire members 20 and 50 within the holder 70 are suitably set. This advantageously limits displacement of the arrangement positions of the electric wire members 20 and 50 within the holder 70 from the intended positions. As a result, even when the electric wire members 20 and 50 drawn out from the end portions 61 and 62 of the tubular member 60 are branched into multiple paths, these branched paths are formed in a suitable manner.

(2) The multiple housing recesses 86 for individually housing the multiple electric wire members 50 are located in the inner surface of the holder 70. This configuration individually houses multiple electric wire members 50 in multiple housing recesses 86, individually setting the arrangement positions of these electric wire members 50 within the holder 70. Thus, as compared with a configuration in which one housing recess 86 houses multiple electric wire members 50, the arrangement positions of the electric wire members 50 is suitably set.

(3) The holder 70 has the holding portion 88 for sandwiching and holding an electric wire member 20 and the housing recess 87 for housing an electric wire member 20. With this configuration, the holding portion 88 sandwiches and holds an electric wire member 20, and the housing recess 87 houses an electric wire member 20. Thus, the arrangement positions of these electric wire members 20 within the holder 70 are suitably set. As such, the arrangement positions of the electric wire members 20 and 50 within the holder 70 are set in a more suitable manner.

(4) The holder 70 is attached to one longitudinal end portion 61 of the tubular member 60, while the holder 100 is attached to the other longitudinal end portion 62 of the tubular member 60. This configuration suitably sets the arrangement positions of the electric wire members 20 and 50 at both longitudinal ends of the tubular member 60. This further limit displacement of the arrangement positions of the electric wire members 20 and 50 from the intended positions within the holders 70 and 100.

Second Embodiment

Referring to FIGS. 7 to 10, a second embodiment of a wire harness is now described. The description focuses on the differences from the first embodiment. Same reference numerals are given to those components that are the same in the first embodiment. Descriptions of some or all of such components may be omitted.

Figure 7:
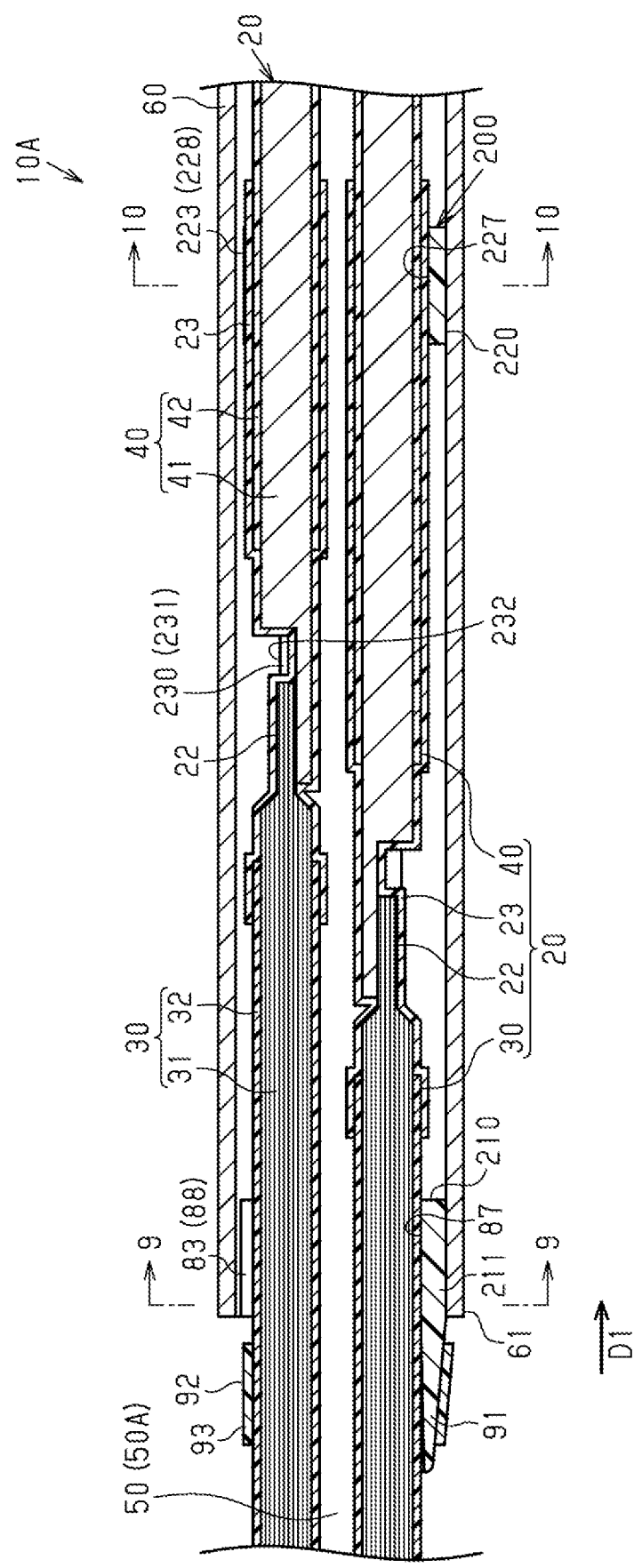
FIG. 7 is a schematic cross-sectional view showing a wire harness of a second embodiment.

As shown in FIG. 7, a wire harness 10A of the present embodiment has a holder 200 instead of the holder 70 shown in FIG. 4. The holder 200 may be attached to an end portion 61 of a tubular member 60. The holder 200 is inserted in the tubular member 60 and thus attached to the end portion 61 of the tubular member 60. The holder 200 may be inserted into the tubular member 60 in the insertion direction D1. The holder 200 may be elongated.

Figure 8:
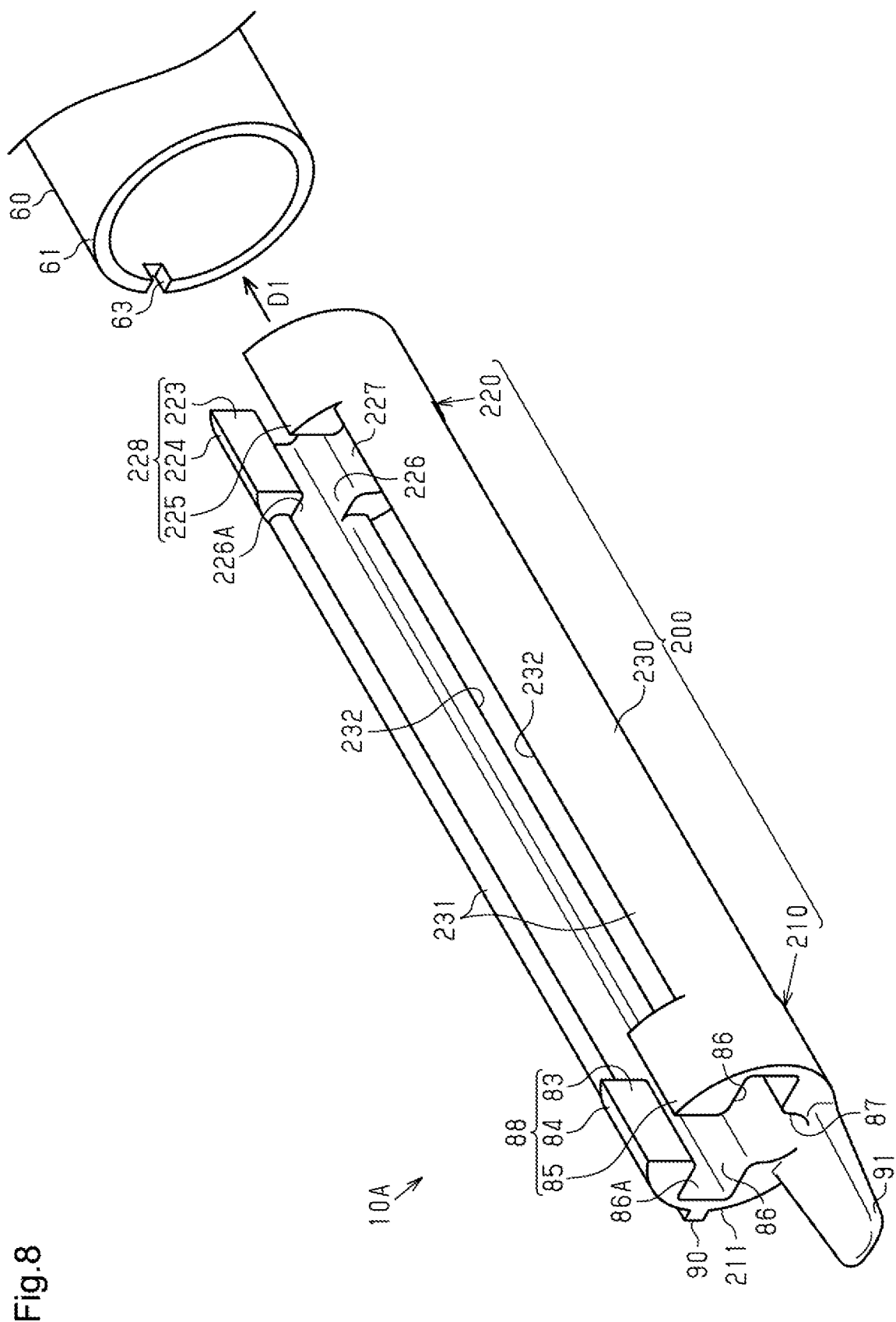
FIG. 8 is an exploded perspective view schematically showing the wire harness of the second embodiment.

As shown in FIG. 8, the holder 200 includes a holding section 210, a holding section 220, which is separated from the holding section 210 in the longitudinal direction (axial direction) of the holder 200, and a connection section 230, which connects the holding sections 210 and 220. The holding section 210 may be located at the longitudinal end of the holder 200 at the trailing side in the insertion direction D1. The holding section 220 may be located at the longitudinal end of the holder 200 at the leading side in the insertion direction D1. The holder 200 may be a single component in which the holding section 210, the connection section 230, and the holding section 220 are integrally formed. The holder 200 may be made of a synthetic resin, such as polyolefin, polyamide, polyester, and ABS resin.

Figure 9:
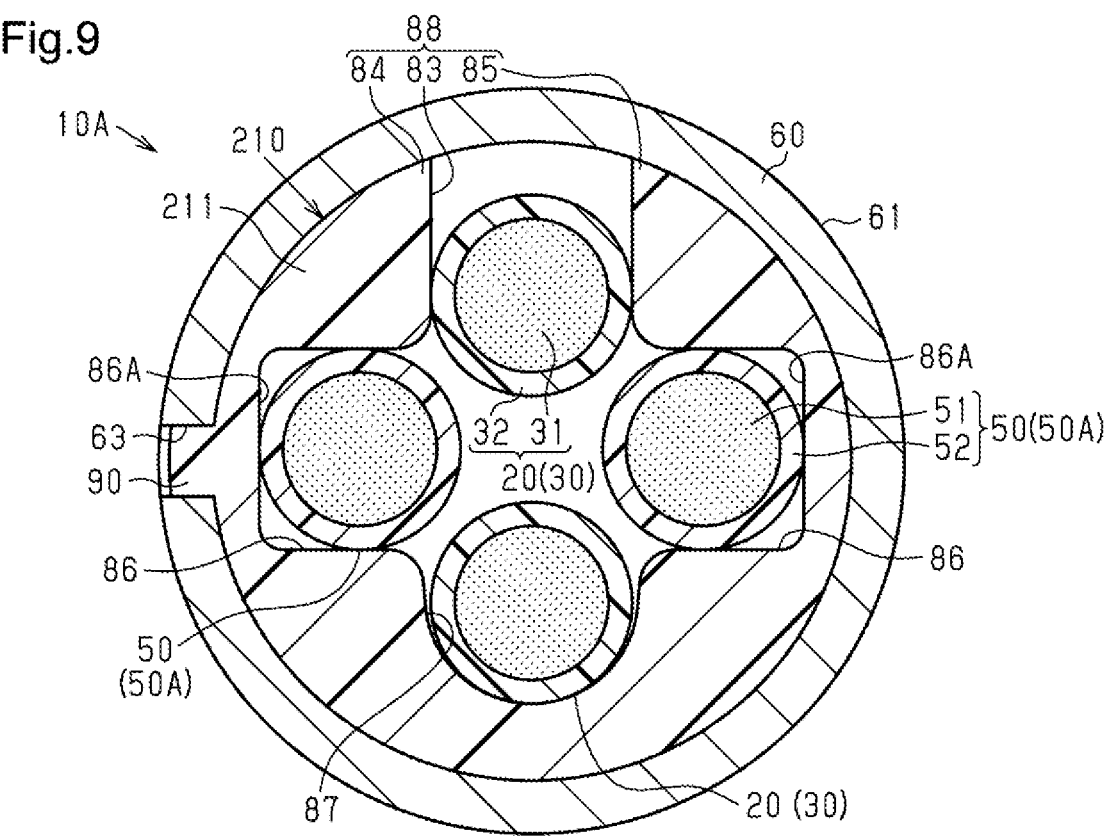
FIG. 9 is a schematic view showing a transverse section of the wire harness of the second embodiment (a cross-sectional view taken along line 9-9 in FIG. 7).

As shown in FIGS. 8 and 9, the holding section 210 is similar in structure to the holder 70 shown in FIG. 4. As shown in FIG. 8, the holding section 210 may include a main body 211, which has multiple housing recesses 86, a housing recess 87, and a holding portion 88, a protrusion 90, and a fixing portion 91.

As shown in FIG. 7, the holding section 210 is located at the trailing side of the joint portions 22 in the insertion direction D1 in the longitudinal direction of the electric wire members 20. The holding section 210 holds the flexible wires 30, which extend partially in the longitudinal direction of the electric wire members 20, for example. The holding section 210 also holds the flexible wires 50A of the electric wire members 50.

In the longitudinal direction of the electric wire members 20, the holding section 220 is located at the leading side of the joint portions 22 in the insertion direction D1. The holding section 220 holds the hard wires 40, which extend partially in the longitudinal direction of the electric wire members 20, for example. The holding sections 210 and 220 hold the electric wire members 20 at opposite sides of the joint portions 22 in the longitudinal direction of the electric wire members 20. In other words, the multiple joint portions 22 are located between the holding sections 210 and 220 in the longitudinal direction of the electric wire member 20.

In each electric wire member 20 of the present embodiment, the covering member 23 covering the joint portion 22 extends to the leading side of the holding section 220 in the insertion direction D1. The holding section 220 holds the hard wires 40, which are covered by the covering members 23 and extend partially in the longitudinal direction of the electric wire members 20.

As shown in FIG. 8, the holding section 220 is tubular. The holding section 220 has the shape of a tube with an outer surface shaped corresponding to the inner surface of the tubular member 60. The holding section 220 of this embodiment has the shape of a circular tube. The outer diameter of the holding section 220 is slightly smaller than the inner diameter of the tubular member 60.

The holding section 220 may have a C-shaped transverse section. The holding section 220 has a slit 223 extending in the axial direction of the holding section 220 at a position in the circumferential direction, for example. The slit 223 extend in the axial direction of the holding section 220. In other words, the holding section 220 has an edge 224 and an edge 225, which is spaced apart from the edge 224 in the circumferential direction of the holding section 220. The slit 223 is formed between the edges 224 and 225 in the holding section 220.

Figure 10:
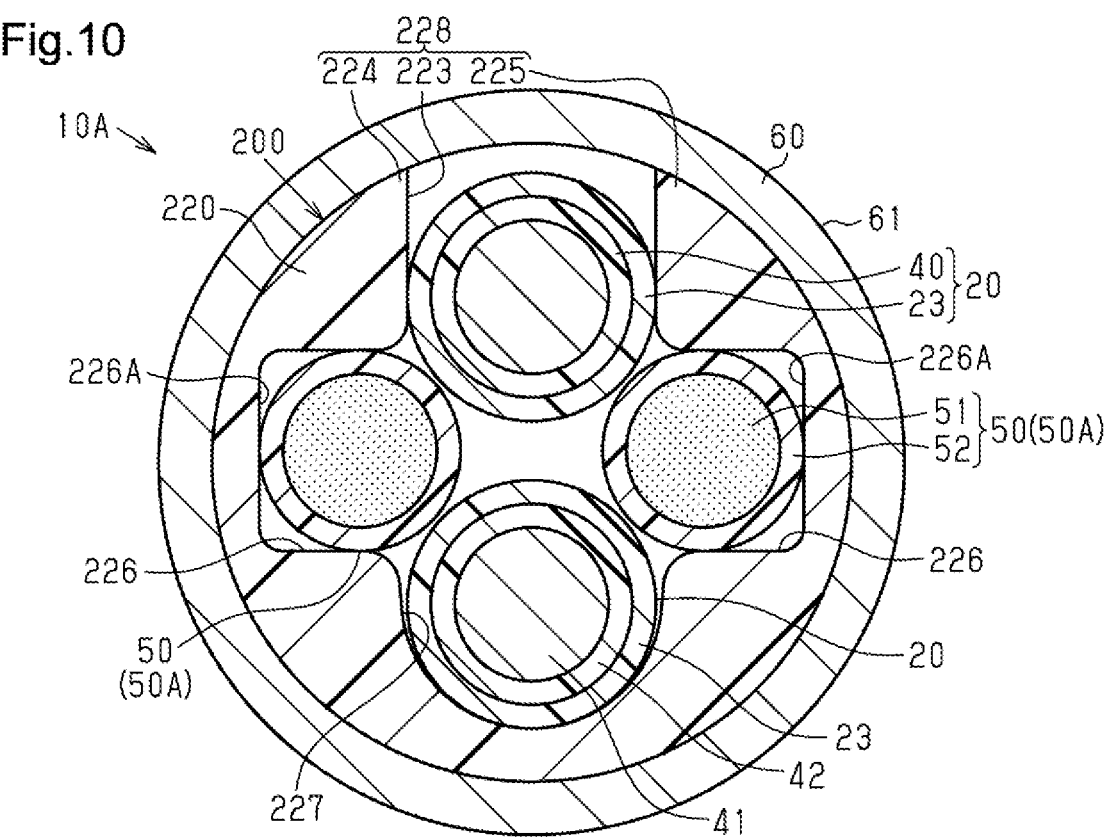
FIG. 10 is a schematic view showing a transverse section of the wire harness of the second embodiment (a cross-sectional view taken along line 10-10 in FIG. 7).

As shown in FIG. 10, the holding section 220 has housing recesses 226 for housing electric wire members 50. The holding section 220 may have two housing recesses 226 for individually housing two electric wire members 50. The housing recesses 226 are located in the inner surface of the holding section 220. The housing recesses 226 extend from the inner surface of the holding section 220 outward in the radial direction of the holding section 220. Each housing recess 226 may be sized to house a part of the electric wire member 50. The inner surface of the housing recess 226 may be in contact with the outer surface of the insulation coating 52 of the electric wire member 50. The inner surface of the housing recess 226 may include a base surface 226A having a linear transverse sectional shape. The transverse sectional shape of the base surface 226A may extend linearly in a direction (an up-down direction as viewed in the drawing) that is perpendicular to a direction in which the two housing recesses 226 are arranged (a right-left direction as viewed in the drawing). The two housing recesses 226 face each other with the central axis of the holding section 220 located in between, for example. The two housing recesses 226 may be formed such that the base surfaces 226A face each other with the central axis of the holding section 220 located in between.

As shown in FIG. 8, each housing recess 226 extends in the axial direction of the holding section 220 over the axial length of the holding section 220. The housing recesses 226 may be aligned with the housing recesses 86 as viewed from the axial direction of the holding section 220.

As shown in FIG. 10, the holding section 220 may also include a housing recess 227 for housing an electric wire member 20 and a holding portion 228 for sandwiching and holding an electric wire member 20. In the holding section 220, the housing recess 227 may house one of the two electric wire members 20, and the holding portion may sandwich and thus hold the other electric wire member 20.

The housing recess 227 is formed in the inner surface of the holding section 220. The housing recess 227 extends from the inner surface of the holding section 220 outward in the radial direction of the holding section 220. The inner surface of the housing recess 227 may be a curved surface of an arcuate shape. The inner surface of the housing recess 227 may be a curved surface corresponding to the outer surface of the electric wire member 20, specifically, the outer surface of the covering member 23 covering the hard wire 40. The housing recess 227 may be sized to house a part of the hard wire 40 and the covering member 23. The inner surface of the housing recess 227 may be an arcuate surface having a greater curvature radius than the inner surface of the housing recess 87 shown in FIG. 9. The inner surface of the housing recess 227 may be in contact with the outer surface of the covering member 23. The housing recess 227 may be located at a position separated from the slit 223 by about 7C rad in the circumferential direction of the holding section 220.

As shown in FIG. 8, the housing recess 227 extends in the axial direction of the holding section 220 over the axial length of the holding section 220. The housing recess 227 may be aligned with the housing recess 87 as viewed from the axial direction of the holding section 220.

As shown in FIG. 10, the holding portion 228 includes edges 224 and 225 in the circumferential direction of the holding section 220 and a slit 223. In the holding portion 228, the surfaces of the edges 224 and 225 face each other. The surfaces of the edges 224 and 225 form the inner surfaces defining the slit 223. The distance between the surfaces of the edges 224 and 225, that is, the width of the slit 223 is smaller than the diameter of the covering member 23 covering the hard wire 40. The width of the slit 223 may be greater than the width of the slit 83 shown in FIG. 9. The holding section 220 is elastically deformable so that the width of the slit 223 can be increased. For example, when a hard wire 40 is inserted into the slit 223, the holding portion 228 is elastically deformed to increase the width of the slit 223. At this time, the surfaces of the edges 224 and 225 sandwich the hard wire 40, allowing the holding portion 228 to hold the single electric wire member 20. The surface of the edges 224 and 225 are in contact with the outer surface of the covering member 23 covering the hard wire 40. The holding portion 228 (the slit 223) and the housing recess 227 may be aligned in a direction (an up-down direction as viewed in the drawing) that is perpendicular to a direction in which the two housing recesses 226 are arranged (a right-left direction as viewed in the drawing) in a transverse section the holding section 220.

As shown in FIG. 8, the holding portion 228 extends in the axial direction of the holding section 220 over the axial length of the holding section 220. The surfaces of the edges 224 and 225 may be in contact with the outer surface of the covering member 23 (FIG. 7) over the axial length of the holding section 220. The holding portion 228 may be aligned with the holding portion 88 as viewed from the axial direction of the holding section 220.

As shown in FIG. 10, within the holding section 220, the two housing recesses 226 individually house two electric wire members 50, the housing recess 227 houses one electric wire member 20, and the holding portion 228 sandwiches the last electric wire member 20. Two electric wire members 50 are housed in the housing recesses 226 and thus held in the holding section 220. One electric wire member 20 is housed in the housing recess 227 and thus held in the holding section 220. The last electric wire member 20 is sandwiched between the holding portion 228 and thus held in the holding section 220. As a result, the arrangement positions of the two electric wire members 20 and the two electric wire member 50 within the holding section 220 are set, and these arrangement positions are maintained.

Configuration of Connection section 230

As shown in FIG. 8, the connection section 230 may include multiple (two in this example) plate-shaped portions 231. The two plate-shaped portions 231 may be formed only in parts in the circumferential direction of the holding sections 210 and 220. The two plate-shaped portions 231 may face each other.

Each plate-shaped portion 231 may have the shape of a thin plate. The plate-shaped portions 231 may extend in the longitudinal direction of the holder 200. The plate-shaped portions 231 may be formed so as to connect the housing recesses 86 of the holding section 210 to the housing recesses 226 of the holding section 220. For example, one longitudinal end of each plate-shaped portion 231 is connected to a housing recess 86, and the other longitudinal end of the plate-shaped portion 231 is connected to a housing recess 226. With the holder 200 of the present embodiment, in the circumferential direction of the holding sections 210 and 220, the connection section 230 is not formed in the area corresponding to the slits 83 and 223 and the area corresponding to the housing recesses 87 and 227. That is, in the holder 200 of the present embodiment, the connection section 230 is not formed in the areas in which the electric wire members 20 (see FIG. 7) are held in the circumferential direction of the holding sections 210 and 220. In other words, in the connection section 230 of the present embodiment, in the circumferential direction of the holding sections 210 and 220, the slits 232 are formed in the areas in which the electric wire members 20 (see FIG. 7) are held.

Each plate-shaped portion 231 has an inner surface facing the electric wire members 20 and 50 (FIG. 7) and an outer surface opposite to the inner surface. The outer surfaces of the plate-shaped portions 231 may be curved. The outer surfaces of the plate-shaped portions 231 may form a circular shape coaxial with the holding sections 210 and 220. The outer surfaces of the plate-shaped portions 231 may be integral and continuous with the outer surfaces of the holding sections 210 and 220. Parts of inner surfaces of the plate-shaped portions 231 may be integral and continuous with the inner surfaces of the housing recesses 86 and 226.

As shown in FIG. 7, the connection section 230 may overlap with the joint portions 22 in the longitudinal direction of the electric wire member 20. Since the core wire 31 and the single core wire 41 of each joint portion 22 are placed over each other in the radial direction, the joint portion 22 may have a larger cross-sectional area than a portion in which only the core wire 31 is present and a portion in which only the single core wire 41 is present. Thus, in some cases, the joint portion 22 may protrude radially outward of the flexible wire 30, and may also protrude radially outward of the hard wire 40. However, the slits 232 formed in the connection section 230, or the absence of the connection section 230 in the areas aligned with the core wire 31 and the single core wire 41 in a direction they are placed over each other, advantageously limits the interference between the joint portion 22 and the connection section 230.

In addition to advantages (1) to (4) of the first embodiment, the embodiment described above has the following advantages.

(5) The holder 200 holds each electric wire member 20 at opposite sides of the joint portion 22 in the longitudinal direction of the electric wire member 20. With this configuration, the holder 200, which holds the electric wire member 20 at opposite sides of the joint portion 22, stably holds the joint portion 22 and the entire electric wire member 20. This advantageously limits movement of the joint portion 22 in the holder 200. As a result, the joint state of the core wire 31 of the flexible wire 30 and the single core wire 41 of the hard wire 40 is suitably maintained.

(6) The holder 200 includes the holding section 210 holding each flexible wire 30, which extends partially in the longitudinal direction of the electric wire member 20, the holding section 220 holding each hard wire 40, which extends partially in the longitudinal direction of the electric wire member 20, and the connection section 230, which connects the holding sections 210 and 220. With this configuration, the holding sections 210 and 220 hold each electric wire member 20 at opposite sides of the joint portion 22. Additionally, the connection section 230 connects the holding sections 210 and 220 to each other, so that holding sections 210 and 220 are formed as a single component.

(7) The holding section 220 holds the covering member 23 covering the outer circumference of the insulation coating 42 of each hard wire 40, which extends partially in the longitudinal direction of the electric wire member 20. As such, when the holding section 220 holds the hard wire 40, the holding section 220 is unlikely to be in direct contact with the insulation coating 42 of the hard wire 40. This advantageously limits wear of the insulation coating 42, which would otherwise result when the holding section 220 holds the insulation coating 42. For example, even when oscillations or other conditions occur while the housing recess 227 and the holding portion 228 of the holding section 220 hold the hard wires 40, the insulation coatings 42 are unlikely to wear at the housing recess 227 or the holding portion 228. Thus, the insulation coating 42 is less prone to wear, improving the durability of the electric wire member 20.

Other Embodiments

The embodiments described above may be modified as follows. The embodiments and the following modifications may be combined to the extent that does not cause technical contradiction.

There is no limitation to the transverse sectional shapes of the holders 70, 100, and 200 of the embodiments described above. For example, the inner surface of each housing recess 86, 226 may be a curved surface of an arcuate shape. The transverse sectional shape of the base surface of each housing recess 87, 227 may be the shape of a linear plane.

The holders 70, 100, and 200 of the above embodiments have the shape of a circular tube, but they may have other shapes. For example, the holders 70, 100, and 200 may have the shape of a polygonal tube.

The positions of the housing recesses 86 and 87 and the holding portion 88 formed within the holder 70, 100 in the first embodiment may be modified as appropriate. For example, the two housing recesses 86 may be arranged side by side in the circumferential direction of the main body 80. Furthermore, the housing recess 87 and the holding portion 88 may be arranged side by side in the circumferential direction of the main body 80.

The positions of the housing recesses 86 and 87 and the holding portion 88 formed within the holding section 210 of the holder 200 in the second embodiment may be modified as appropriate. Similarly, the positions of the housing recesses 226 and 227 and the holding portion 228 formed within the holding section 220 may be modified as appropriate.

The holder 70, 100 of the first embodiment may include multiple housing recesses 87.

The holder 200 of the second embodiment may include multiple housing recesses 87. Also, the holder 200 may include multiple housing recesses 227.

The holder 70, 100, 200 of each embodiment does not have to include the housing recess 87, 227.

The holder 70, 100, 200 of each embodiment does not have to include the holding portion 88, 228.

The holder 70, 100 of the first embodiment has multiple housing recesses 86 for individually housing multiple electric wire members 50, but the configuration is not limited to this. For example, one housing recess 86 may house multiple electric wire members 50.

The holder 70 of the first embodiment holds the insulation coating 32 of each flexible wire 30, which extends partially in the longitudinal direction of the electric wire member 20, but the configuration is not limited to this. For example, the holder 70 may hold the covering member 23 covering the outer circumference of the insulation coating 32.

In the holder 200 of the second embodiment, the holding section 210 holds the insulation coating 32 of each flexible wire 30, which extends partially in the longitudinal direction of the electric wire member 20, but the configuration is not limited to this. For example, the holder 200 may be configured such that the holding section 210 holds the covering member 23 covering the outer circumference of the insulation coating 32.

In the holder 200 of the second embodiment, the holding section 220 holds the covering member 23 covering the outer circumference of the insulation coating 42 of each hard wire 40, which extends partially in the longitudinal direction of the electric wire member 20, but the configuration is not limited to this. For example, the holder 200 may be configured such that the holding section 220 directly holds the outer circumference of the insulation coating 42.

In the above embodiments, the holder 70, 200 and the holder 100 are provided at both longitudinal ends of the tubular member 60, but the configuration is not limited to this. For example, the holder 70, 200 may be provided only at one longitudinal end of the tubular member 60.

In the above embodiments, the protrusion 90 serves as the first engagement portion, and the cutout section 63 serves as the second engagement portion. However, the engagement structure between the holder 70, 200 and the tubular member 60 is not limited to this. The first and second engagement portions may have any configurations that maintain the position of the holder 70, 200 relative to the tubular member 60 when the first and second engagement portions engage with each other.

The protrusion 90 and the cutout section 63, 64 of the above embodiments may be omitted.

In the above embodiments, the fixing member 92 is formed by the tape member 93, but the configuration is not limited to this. For example, the fixing member 92 may be a metal band or a plastic binding band.

The fixing member 92 of the above embodiments may be omitted. In this case, the fixing portion 91 of the holder 70, 200 may also be omitted.

In the above embodiments, the multiple joint portions 22 are located at positions separated in the longitudinal direction of the electric wire member 20, but the configuration is not limited to this. For example, the joint portions 22 may be arranged side by side in the longitudinal direction of the electric wire member 20.

In the above embodiments, there is no limitation to the number of electric wire members 20 and 50 extending through the holder 70, 200. The number of electric wire members 20 and 50 may be modified according to the specifications of the vehicle V. For example, the number of electric wire members 20 may be one or three or more. Also, the number of electric wire members 50 may be one or three or more.

The tubular member 60 of the above embodiments is not limited to a member made of a single material, such as a metal or a resin. For example, the tubular member 60 may be a composite member in which a conductive shield layer is formed on or embedded in a non-metal pipe main body.

In the above embodiments, an exterior member having branched paths may be interposed between the tubular member 60 and the exterior members 65 and 66. Such an exterior member may be a rubber waterproof cover, for example.

Although not specifically mentioned in the above embodiments, an electromagnetic shield member may be provided inside the tubular member 60. The electromagnetic shield member may collectively enclose multiple electric wire members 20. The electromagnetic shield member may be provided between the inner surface of the tubular member 60 and the outer surfaces of the electric wire members 20. The electromagnetic shield member may be a flexible braided wire or a metal foil.

The positional relationship of the electric devices M1 to M4 in the vehicle V is not limited to the above embodiments and may be modified as appropriate according to the vehicle configuration.

In the illustrated embodiment(s), the inner surface of the tubular member 60 may be an even surface. The main body 80 of the holder 70 may have a straight cylindrical outer surface corresponding to the inner surface of the tubular member 60.

In the illustrated embodiment(s), the holder 70 may hold the electric wire member (first electric wire member) 20 that connects a first group of the electric devices M1, M2 and the electric wire member (second electric wire member) 50 that connects a second group of the electric devices M3, M4 together inside the main body 80.

In the illustrated embodiment(s), the portions of the electric wire member (first electric wire member) 20 and the electric wire member (second electric wire member) 50 that are accommodated within the longitudinal end of the tubular member 60 may be fitted in the housing recesses 87 and 86 of the holder 70, respectively.

The holders 70, 100, 200 of the illustrated embodiment(s) each may be referred to as an electric wire reception plug. The housing recesses 86, 87 and the slit 83 of the illustrated embodiment(s) each may be referred to as an electric wire reception groove. The cutout section 63 of the illustrated embodiment(s) may be referred to as a key groove. The protrusion 90 of the illustrated embodiment(s) may be referred to as a key or a key protrusion. As illustrated in FIG. 5, the housing recesses 86, 87 and the slit 83 of the holder 70 may form radially inward projections therebetween. The radially inward projections, formed between the housing recesses 86, 87 and the slit 83 of the holder 70, may separate the electronic wires 20, 50 one another in a circumferential direction of the tubular member 60, and may be referred to as electric wire separator projections.

It should be understood that the embodiments disclosed herein are only illustrative in all respects and should not be taken as limiting. It is intended that the scope of the present invention is defined in the claims, not by the descriptions above, and covers all modifications within the scope of the claims and their equivalent.

REFERENCE SIGN LIST 10, 10A . . . Wire Harness
20 . . . Electric Wire Member (First Electric Wire Member)
22 . . . Joint Portion
23 . . . Covering Member
30 . . . Flexible Wire (First Flexible Wire)
31 . . . Core Wire
32 . . . Insulation Coating (First Insulation Coating)
40 . . . Hard Wire
41 . . . Single Core Wire
42 . . . Insulation Coating (Second Insulation Coating)
50 . . . Electric Wire Member (Second Electric Wire Member)
50A . . . Flexible Wire (Second Flexible Wire)
51 . . . Core Wire
52 . . . Insulation Coating
60 . . . Tubular Member
61, 62 . . . End Portion
63 . . . Cutout Section (Second Engagement Portion)
64 . . . Cutout Section
65, 66 . . . Exterior Member
70 . . . Holder (First Holder)
80 . . . Main Body
81, 82 . . . End Portion
83 . . . Slit
84, 85 . . . Edge
86 . . . Housing Recess (First Housing Recess)
86A . . . Base Surface
87 . . . Housing Recess (Second Housing Recess)
88 . . . Holding Portion
90 . . . Protrusion (First Engagement Portion)
91 . . . Fixing Portion
92 . . . Fixing Member
93 . . . Tape Member
100 . . . Holder (Second Holder)
110 . . . Main Body
120 . . . Protrusion
200 . . . Holder (First Holder)
210 . . . Holding Section (First Holding Section)
211 . . . Main Body
220 . . . Holding Section (Second Holding Section)
223 . . . Slit
224, 225 . . . Edge
226 . . . Housing Recess
226A . . . Base Surface
227 . . . Housing Recess
228 . . . Holding Portion 230 . . . Connection section
231 . . . Plate-Shaped Portion
232 . . . Slit
M1, M2, M3, M4 . . . Electric Device
V . . . Vehicle
D1 . . . Insertion Direction Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A wire harness comprising:
a first electric wire member including a first flexible wire and a hard wire electrically connected to the first flexible wire;
a second electric wire member including a second flexible wire;
a tubular member through which the first and second electric wire members extend, the tubular member including a circumferential wall that is formed continuously over the entire circumference in a circumferential direction; and
a tubular holder that is attached to a longitudinal end portion of the tubular member and holds the first and second electric wire members therein, wherein
the holder has a first housing recess that is located in an inner surface of the holder and houses the second electric wire member,
the holder has a slit extending in an axial direction of the holder,
when the holder is not attached to the tubular member, the slit is arranged to allow each of the first and second electric wire members to be inserted into the holder through the slit, and
when the holder is attached to the tubular member, the holder is arranged to hold the first electric wire member in the slit by using the slit to sandwich the first electric wire member, and when the holder is attached to the tubular member, the slit is covered by the tubular member.

2. The wire harness according to claim 1, wherein
the second electric wire member is one of a plurality of second electric wire members, and
the first housing recess is one of a plurality of first housing recesses of the holder, the first housing recesses individually housing the second electric wire members.

3. The wire harness according to claim 1, wherein
the first electric wire member is one of a plurality of first electric wire members, and
the slit functions as a holding portion of the holder that sandwiches and holds one of the first electric wire members.

4. The wire harness according to claim 3, wherein the holder includes a second housing recess that is located in the inner surface of the holder and houses at least one of the first electric wire members.

5. The wire harness according to claim 1, wherein
the first electric wire member includes a joint portion at which the first flexible wire is joined to the hard wire, and
the holder holds the first electric wire member at opposite sides of the joint portion in a longitudinal direction of the first electric wire member.

6. The wire harness according to claim 5, wherein
the holder includes:
a first holding section that holds the first flexible wire, which extends partially in the longitudinal direction of the first electric wire member, the first holding section also holding the second electric wire member;
a second holding section that holds the hard wire, which extends partially in the longitudinal direction of the first electric wire member, the second holding section also holding the second electric wire member; and
a connection section connecting the first holding section to the second holding section.

7. The wire harness according to claim 6, wherein
the first flexible wire includes a core wire including metal strands and a first insulation coating covering an outer circumference of the core wire,
the hard wire includes a single core wire including a single conductor and a second insulation coating covering an outer circumference of the single core wire,
the joint portion includes a structure in which a section of the core wire that is exposed from an end of the first insulation coating is joined to a section of the single core wire that is exposed from an end of the second insulation coating,
the first electric wire member includes a covering member covering the joint portion,
the covering member covers an outer circumference of the first insulation coating and an outer circumference of the second insulation coating, and
the second holding section holds a section of the covering member that covers the outer circumference of the second insulation coating, which extends partially in the longitudinal direction of the first electric wire member.

8. The wire harness according to claim 1, further comprising:
a fixing member that fixes the first and second electric wire members to the holder, wherein
the holder includes a first engagement portion that engages with the tubular member and a fixing portion that is located outside the tubular member,
the tubular member includes a second engagement portion that engages with the first engagement portion, and
the fixing member fixes the first and second electric wire members to the fixing portion.

9. The wire harness according to claim 1, wherein
the holder is a first holder,
the wire harness comprises the first holder attached to one of longitudinal end portions of the tubular member, and a tubular second holder attached to the other longitudinal end portion of the tubular member,
the second holder holds the first and second electric wire members therein, and
the second holder has a third housing recess that is located in an inner surface of the second holder and houses the second electric wire member.

10. A wire harness comprising:
a bundle of electric wire members;

a tubular member surrounding a certain length of the bundle of electric wire members, the tubular member including a circumferential wall that is formed continuously over the entire circumference in a circumferential direction, and the tubular member further including an axis, a first axial open end, a second axial open end, and a radially inward surface, wherein the bundle of electric wire members includes two ends drawn out from the first and second axial open ends, respectively; and an electronic wire reception plug fitted in the first axial open end of the tubular member, wherein one of the first axial open end of the tubular member and the electronic wire reception plug includes a key groove and the other includes a key protrusion corresponding to the key groove, the key groove and the key protrusion are configured to prevent the electronic wire reception plug from rotating relative to the first axial open end of the tubular member and to define a plugging depth of the electronic wire reception plug relative to the tubular member in an axial direction of the tubular member, the electronic wire reception plug includes a radially outward surface corresponding to or being in direct surface contact with the radially inward surface of the tubular member, and a radially inward surface including or forming electronic wire reception grooves configured to receive the electric wire members, respectively, one of the electronic wire reception grooves is a radially extending slit that opens in the radially outward surface of the electronic wire reception plug, when the electronic wire reception plug is not attached to the first axial open end of the tubular member, the radially extending slit is arranged to allow each of the electric wire members to be inserted into the electronic wire reception plug through the radially extending slit from the radially outward surface of the electronic wire reception plug, and when the electronic wire reception plug is attached to the first axial open end of the tubular member, the electronic wire reception plug is arranged to hold one of the electric wire members in the slit by using the radially extending slit to sandwich the electric wire member, and when the electronic wire reception plug is attached to the first axial open end of the tubular member, the radially extending slit is covered by the tubular member.

11. A wire harness according to claim 10, wherein the radially inward surface of the electronic wire reception plug includes electric wire separator projections, each formed between adjacent two of the electronic wire reception grooves and configured to separate the electric wires from one another in a circumferential direction of the tubular member.

12. A wire harness according to claim 10, wherein the total number of the electronic wire reception grooves of the electronic wire reception plug is equal to the total number of the electric wire members extending through the tubular member.

13. A wire harness according to claim 10, wherein the electronic wire reception grooves each have a groove length corresponding to the plugging depth of the electronic wire reception plug with respect to the tubular member.

14. A wire harness according to claim 10, wherein the electronic wire reception plug is snug fitted in the first axial open end of the tubular member.

\* \* \* \* \*